(12) United States Patent
Ponder (10) Patent No.: US 9,387,898 B2
(45) Date of Patent: Jul. 12, 2016

(54) BICYCLE RACK SYSTEM APPARATUS AND METHOD OF USE (71) Applicant: Bruce Ponder, Albuquerque, NM (US)

(72) Inventor: Bruce Ponder, Albuquerque, NM (US)

( * ) Notice: Subject to any disclaimer, the term of this patent is extended or adjusted under 35 U.S.C. 154(b) by 51 days.

(21) Appl. No.: 13/764,591

(22) Filed: Feb. 11, 2013

(65) Prior Publication Data

US 2014/0224852 A1   Aug. 14, 2014

(51) Int. Cl.
*B62J 11/00*   (2006.01)
*B62J 7/00*   (2006.01)
*B62J 7/04*   (2006.01)

(52) U.S. Cl.
CPC ..... *B62J 7/00* (2013.01); *B62J 7/04* (2013.01); *Y10T 29/49826* (2015.01)

(58) Field of Classification Search
CPC .................. B62J 7/04; B62J 7/00; B62J 7/08; B62J 9/001
USPC .................................................. 224/421, 422
See application file for complete search history.

(56) References Cited

U.S. PATENT DOCUMENTS 5,090,717 A * 2/1992 Belka .......................... 280/304.5

* cited by examiner

*Primary Examiner* — Adam Waggenspack
(74) *Attorney, Agent, or Firm* — Kameron W. Kramer (57) ABSTRACT

The present invention relates generally to a bicycle rack system providing for bicycle transportation of articles, and more particularly to a system for a quick release, modular, and expandable bicycle rack system. The present invention comprises a bicycle rack system comprising a bottom connector comprising two portions; a front top connector comprising two portions; a rear top connector comprising two portions; tubes both hollow or solid inserted within and secured by the bottom, rear top, and front top connectors; and an adjustable female receiving plate and male insert that is attached to the adjustable female receiving plate. The male insert and female receiving plate are disposed adjacent to a bicycle axle and securably attached to the bottom connector. The unique configuration of the bicycle rack system provides a modular, sturdy, and easily installed bicycle rack.

2 Claims, 13 Drawing Sheets

BICYCLE RACK SYSTEM APPARATUS AND METHOD OF USE

CROSS-REFERENCE TO RELATED APPLICATION

This application claims the benefit of U.S. Provisional Patent Application Ser. No. 61/596,828 filed Feb. 9, 2012, titled "Ride-A-Rack is a modular expanding bicycle seat and rack system that universally mounts Rack-to-Bicycle and also Rack-to-Accessories as the "male-end" to unique male/female receiver mounts and collapsible rear extension arms to provide a "convertible" cargo-bicycle seat. It fits onto most any bicycle, is on or off in seconds, with one hand and no tools" and the subject matter thereof is incorporated herein by reference thereto.

TECHNICAL FIELD

The present invention relates generally to bicycle transportation of articles, and more particularly to a system for a quick-release, modular, and expandable bicycle rack system with a universal fit connection system.

BACKGROUND ART

Bicycles are useful modes of transportation but have both cargo and seating inadequacies.

Banana seats are stylish but cannot carry much cargo. Backpacks and messenger bags affect the balance of the bicycle and the bicyclist. Bicycle rack systems currently known, sold, and used are limited in size, have a limited weight capacity, and create an uncomfortable ride for the bicyclist. Additionally, bicycle rack systems currently on the market can be difficult to install and uninstall. Long-frame "cargo bicycles" are an alternative to bicycle rack systems in that they can carry more cargo than normal bicycles. However, they are large and expensive. The market has not yet provided a cargo solution for bicyclists who choose to use a bicycle to transport substantial loads that provides for a quick release, modularity, a universal fit, and expandability.

The present invention comprises a bicycle rack system that is an improvement on the bicycle rack systems currently available by providing seating for two riders, which is an improvement on currently available tandems. Tandem bicycles are cumbersome, expensive and always accommodate two bicyclists, with no flexibility to accommodate a single rider. The present invention is flexible and provides for seating for two if needed. The present invention provides for additional storage, if needed, and for an additional seat for an additional passenger, or provides for a banana seat to be added to the bicycle.

Many devices are known in the prior art for bicycle rack systems and the transportation of cargo on bicycles. Additionally, many devices such as saddle bags are known in the prior art are mounted over the bicycle wheel for additional storage.

There currently are no well-designed, simple devices currently available that easily handle heavy or bulky cargo or passengers without being expensive or complex. Currently available bicycle rack systems are either permanently affixed to bicycles, are ill-fitting, or are flimsy retrofit additions resulting in most bicyclists choosing to forego installing a bicycle rack on his or her bicycle or deciding to not install an extra seat even when both installations would be extremely useful. Thus, there is a need for a quick-release, modular, sturdy, expandable bicycle rack system that can be installed on any bicycle, thus having a "universal fit."

It is increasingly critical that answers be found to the challenges arising from inadequate bicycle rack system designs due to the increase in bicycling commuting. Additionally, the need to reduce costs, improve efficiencies and performance, and meet competitive pressures adds an even greater urgency to creating new bicycle rack system products that meet the needs of a diverse community of bicyclists.

The present invention provides an apparatus for and method of transporting materials via bicycle that are an improvement on bicycle rack system devices presently available. The present invention provides for a bicycle rack system that is easily mounted on and removed from any bicycle, is affordable, is modular, is flexible, and accommodates heavy loads, including an additional passenger. The present invention overcomes the limitations and difficulties described previously with respect to bicycle rack systems currently available by providing a quick-release, modular, universal fit, and expandable bicycle rack system.

An advantage of the apparatus of the present invention is that it is universally fitted to any bicycle. Another advantage of the present invention is it is modular. Any purchaser of the bicycle rack system of the present invention can easily assemble and install the rack of the present invention. Additionally, the modularity provides for any number of attachments to be easily attached to the bicycle rack system of the present invention, which greatly increases the functionality of the bicycle rack system. Another advantage of the apparatus of the present invention is it is quickly released. Yet another advantage of the present invention is it is easily expandable. The resulting device is straightforward, cost-effective, uncomplicated, highly versatile, and effective, and is implemented by adapting known components for ready, efficient, and economical manufacturing, application, and utilization.

Certain embodiments of the invention have other steps or elements in addition to or in place of those mentioned above. The steps or element will become apparent to those skilled in the art from a reading of the following detailed description when taken with reference to the accompanying figures.

SUMMARY OF THE INVENTION

The present invention comprises a bicycle rack system comprising a bottom connector comprising two portions; a front top connector comprising two portions; a rear top connector comprising two portions; a plurality of tubes inserted in said bottom, rear top, and front top connectors; and an adjustable female receiving plate; and a male insert connectably attached to the adjustable female receiving plate wherein the male insert and female receiving plate are disposed adjacent to a bicycle axle and the female receiving plate and insert are securably attached to the bottom connector.

The present invention also comprises a method of installing a bicycle rack system comprising providing a bottom connector comprising two portions; providing a front top connector comprising two portions; providing a rear top connector comprising two portions; inserting a plurality of tubes in said bottom, rear top, and front top connectors; connectably attaching a male insert to an adjustable female receiving plate; and disposing the male insert and the connected adjustable female receiving plate adjacent to a bicycle axle; and securably attaching the male insert and the adjustable female receiving plate to the bottom connector.

DETAILED DESCRIPTION OF THE INVENTION

The best mode for carrying out the invention will be described herein. The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known system configurations, and process steps are not disclosed in detail.

The figures illustrating embodiments of the system are semi-diagrammatic and not to scale and, particularly, some of the dimensions are for the clarity of presentation and are shown exaggerated in the drawing figures.

The same numbers are used in all the drawing figures to relate to the same elements. The embodiments have been numbered first embodiment, second embodiment, etc. as a matter of descriptive convenience and are not intended to have any other significance or provide limitations for the present invention.

For expository purposes, the term "horizontal" as used herein is defined as a plane parallel to the plane or surface of the bicycle rack system, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact among elements.

Figure 1:
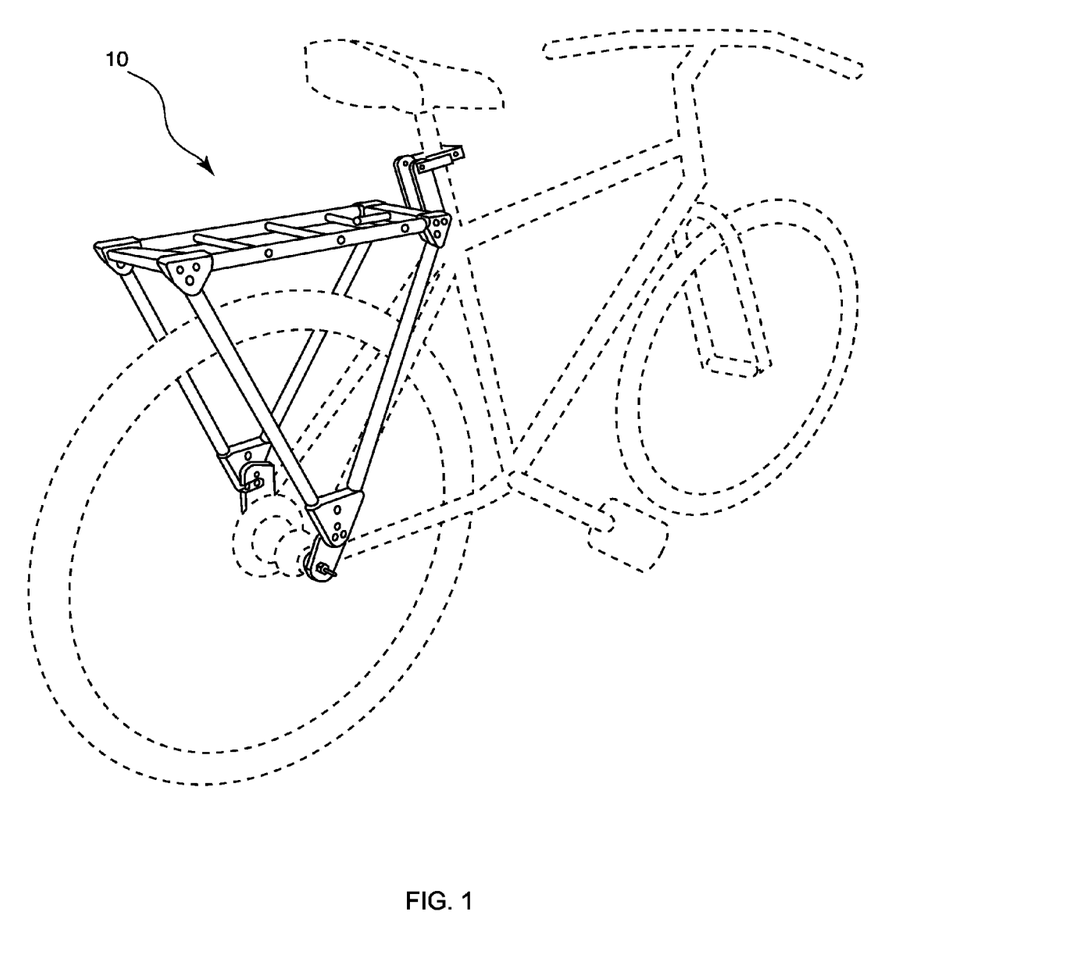
FIG. 1 illustrates a perspective view of a first embodiment of the bicycle rack system of the present invention installed on a bicycle.

FIG. 1 illustrates a perspective view of a first embodiment of the bicycle rack system of the present invention installed on a bicycle. The bicycle rack system is attachably disposed on the seat tube as well as to the rear axle. FIG. 1 illustrates a perspective view of a first embodiment of the bicycle rack system 10 of the present invention installed on a bicycle. As best illustrated in FIG. 1, the bicycle rack system 10 comprises a v-shape frame that attaches to both sides of the rear wheel skewer rod and the seat post. Each side of the v-shape frame is connected by any number of cross bars.

Figures 2A, 2B:
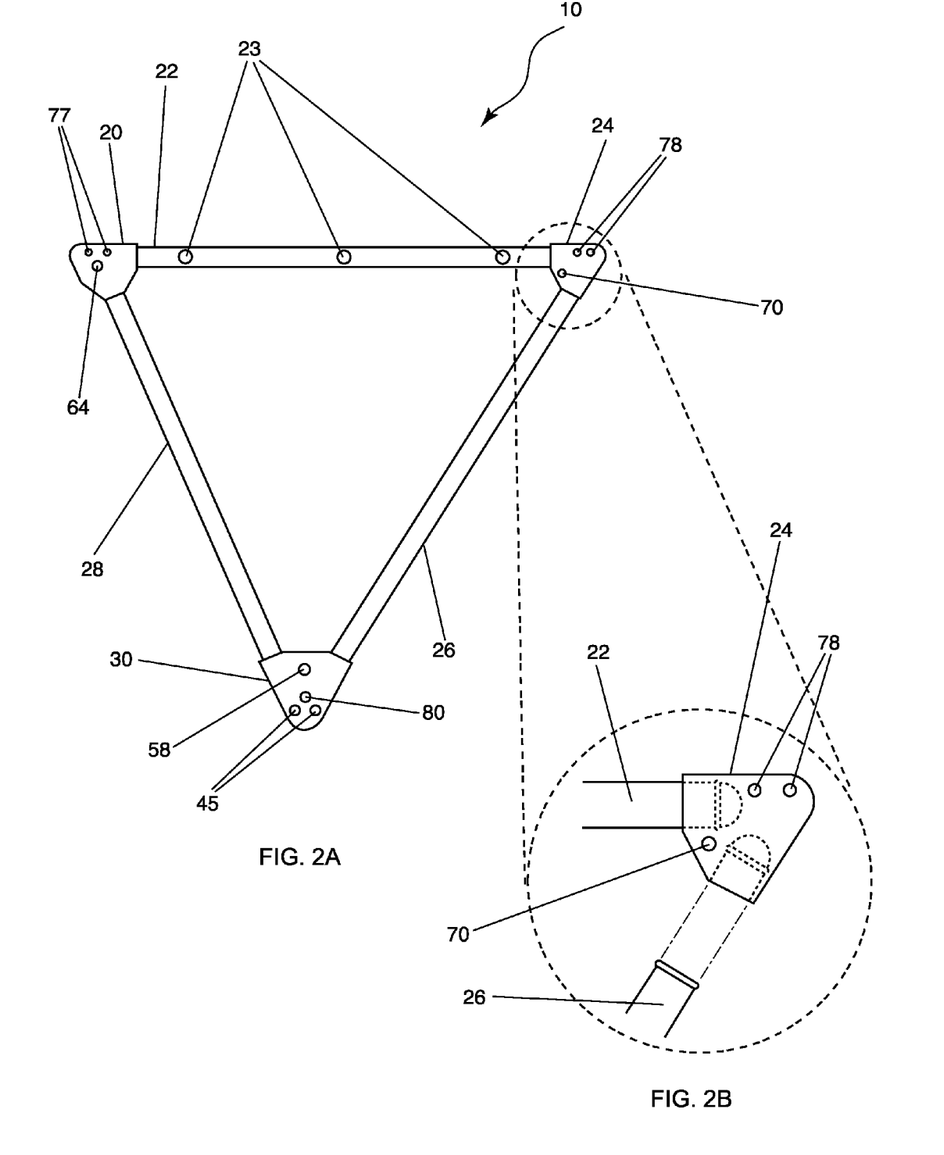
FIG. 2A illustrates a side view of the bicycle rack system of the present invention.
FIG. 2B illustrates an exploded view of the upper forward mount connector element.

FIG. 2A illustrates a side view of the bicycle rack system of the present invention. Upper mounting tube 22 is attachably disposed in upper rear mount connector 20 and upper forward mount connector 24. Upper mount tube 22 comprises upper mount tube openings 23. Upper mount tube openings 23 accommodate a plurality of stabilizing and strengthening elements 34, 34', and 34", illustrated in FIG. 3. Upper rear mount connector 20 comprises upper rear mount connector fastener openings 77 and upper rear mount connector fastener opening 64 to accommodate a fastener to secure the two portions of upper rear mount connector 20. Rear mounting tube 28 is attachably disposed in upper rear mount connector 20 and lower mount connector 30. Lower mount connector 30 comprises lower mount connector opening 58 to accommodate a fastener to secure the two portions of lower mount connector 30 and lower mount connector male fasteners 44 to accommodate a male receiving fastener. Lower mount connector male fasteners 44 provide fine adjusting for installation of the bicycle rack system of the present invention. The thickness of lower female receiving plate insert 46 and the availability of a variety of embodiments, including lower bicycle receiving mount embodiment 72 and lower bicycle receiving mount embodiment 71, as illustrated in FIG. 10, provide coarse adjusting for installation of the bicycle rack system of the present invention.

Front mounting tube 26 is disposably attached to lower mount connector 30 and upper forward mount connector 24. Upper forward mount connector 24 comprises fastener openings 78 and connector fastener opening 70 to accommodate a fastener to secure the two portions of upper mount connector 24.

Upper rear mount connector 20, upper mounting tube 22 and upper forward mount connector 24 are structural and load bearing elements and comprise hollow tubes or solid bars as required. Upper mount tube openings 23 accommodate fasteners such as screws. These fasteners secure a plurality of accessory elements. Lower mount connector opening 58 accommodate fasteners such as screws which secure a plurality of additional modular elements or attachments.

Each side of bicycle rack system 10 comprises tubular components 26 and 26', 22 and 22', and 28 and 28', which are connected via upper forward mount connectors 24 and 24' comprising upper forward mount connector outer portions 124 and 124' and upper forward mount connector inner portions 125 and 125', lower mount connectors 30 and 30' comprising lower mount connector outer portions 130 and 130' and lower mount connector inner portions 131 and 131', and upper rear mount connectors 20 and 20' comprising upper rear mount connector outer portions 120 and 120' and upper rear mount connector inner portions 121 and 121', respectively.

The configuration of upper rear mount connector 20, lower mount connector 30, and upper forward mount connector 24 prevents the removal of the mounting tubes after the two portions of each connector is closed and fastened. Tubes are replaced if broken or if solid bar tubes are required for increased loads or additional seating. This replacement and modular extension embodiment is novel to behind-the-bicycle rack systems. A unique angled opening is disposed within each connector, providing the tubes to be in a non-paralleled position relative to the tubes on the opposite side of the bicycle rack of the present invention. This non-parallel configuration provides for greater stability and for a greater diversity of accessories, and for the rack to fit on a greater diversity of bicycles. This configuration provides for straight tubes to be disposed within the connectors at the proper angle, thus providing strength and providing for straight, not bent, tubes and thus provides increased stability and for modular adjustment via removing, shortening, adjusting or lengthening the size, shape and length or tube.

FIG. 2B illustrates an exploded view of upper forward mount connector 24 illustrating how tubes 22 and 26 are inserted and fastened within upper forward mount connector 24. The interior of upper forward mount connector 24 is machined in order to secure tubes 22 and 26. Each connector is comprised of two pieces and is secured via retaining fasteners comprising screws inserted into upper forward mount connector fastener openings 70 and 70', lower mount connector openings 58 and 58', and upper rear mount connector openings 64 and 64'. This modularity provides for easy assembly and lower shipping costs due to the modularity of the bicycle rack system of the present invention. Upper mount tube openings 23 are used to secured crossbars 34, 34', and 34". Upper rear mount connector fastener openings 77 and 77' secure upper rear mount connectors 20 and 20' to each other via back crossbar 39. Upper forward mount connector fastener openings 78 and 78' secure the two sides of upper forward mount connectors 24 and 24' to each other via front crossbar 38. Lower mount connector male receiving fasteners 44 and 44' are inserted through lower mount connectors 30 and 30' whereby lower mount connector male receiving fasteners 44 and 44' extend past the inner side of lower mount connectors 30 and 30'.

FIG. 2B illustrates a close-up view of upper forward mount connector 24 whereby upper mounting tube 22 and forward mounting tube 26 are inserted. Forward mounting tubes 26 and 26', upper mounting tubes 22 and 22', and rear mounting tubes 28 and 28' all have the same design whereby near the end of the tube, the tube is machined creating an indentation in the tube. This indentation provides for the tubes to securely fit into upper forward mount connectors 24 and 24', lower mount connectors 30 and 30', and upper rear mount connectors 20 and 20'.

Figure 3:
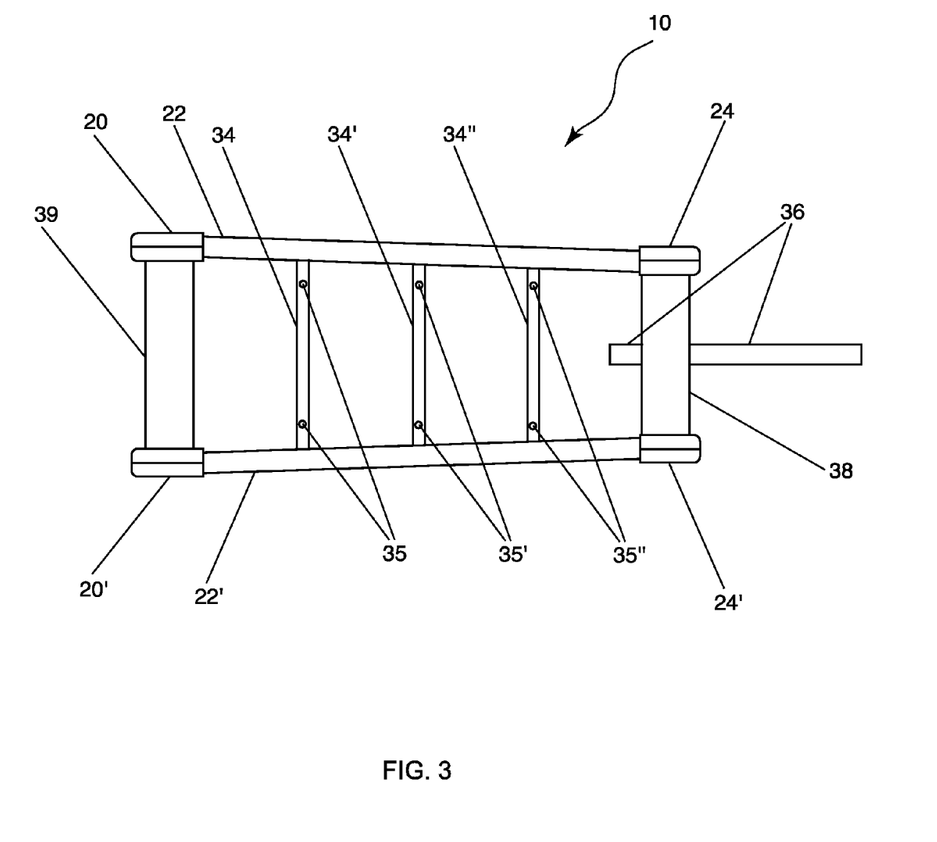
FIG. 3 illustrates a top view of the bicycle rack system of the present invention.

FIG. 3 illustrates a top view of bicycle rack system 10 of the present invention. Upper mounting tubes 22 and 22' are attached to upper forward mount connectors 24 and 24' in the front of bicycle rack 10 and upper rear mount connectors 20 and 20' in the rear of bicycle rack 10. Upper rear mount connectors 20 and 20' attach to each other via back crossbar 39. Upper mounting tubes 22 and 22' comprise a slight taper outwards when installed in upper forward mount connectors 24 and 24' and upper rear mount connectors 20 and 20' and thus are not parallel with each other. However, upper forward mount connectors 24 and 24' are positioned so as to be parallel to each other, as do upper rear mount connectors 20 and 20'. Connectors 24 and 24' are attachably disposed on front crossbar 38. Connectors 20 and 20' are attachably disposed on back crossbar 39. Front crossbar 38 and back crossbar 39 also provide additional support for cargo, provide stability, and prevent torque of the bicycle rack system. Seat post mount 36 is securably attached to bicycle rack system 10 via front crossbar 38 which secures to the seat post of a bicycle using commonly known features in the prior art.

Crossbars 34, 34', and 34" are of variable length and are eliminated if a streamlined configuration is required. An alternate embodiment of bicycle rack system 10 comprises parallel upper mounting tubes 22 and 22', forward mounting tubes 26 and 26', and rear mounting tubes 28 and 28'.

Bicycle rack system 10 is securely attached to the seat post of any bicycle via seat post mount 36. Upper mounting tubes 22 and 22' are attachably disposed in connectors 20, 20', 24, and 24', as previously described. Crossbars 34, 34', and 34" connect upper mounting tubes 22 and 22' and provide additional support for cargo, provide stability, and prevent torque of the bicycle rack system. FIG. 3 illustrates cross bars 34, 34', and 34"; however, any number of cross bars may be added. Crossbar 34 comprises openings 35, crossbar 34' comprises openings 35', and crossbar 34" comprises openings 35". Cross bar openings 35, 35', and 35" provide accommodations for fasteners to secure a plurality of attachable elements including but not limited to seating or any other accessory as required or needed.

Figure 4:
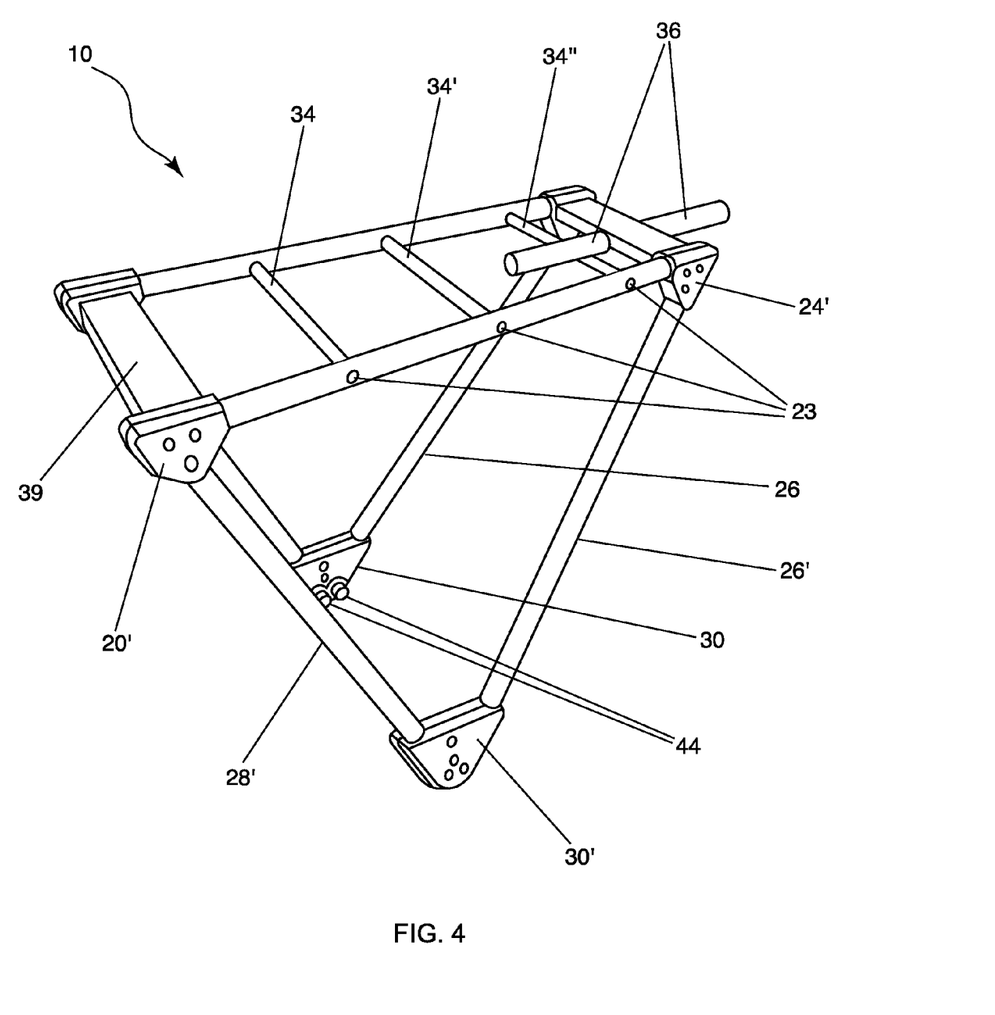
FIG. 4 is a side perspective view of the bicycle rack system of the present invention.

FIG. 4 is a side perspective view of bicycle rack system 10 of the present invention. Bicycle rack system 10 comprises lower male connector male receiving fasteners 44 and 44' that are attachably disposed on the interior portion of lower mount connectors 30 and 30'. Lower mount connector male receiving fasteners 44 and 44' are disposed into and secure lower female receiving plates 50 and 50'. Lower female receiving plates 50 and 51' and lower bicycle receiving mounts 72 and 72' provide a "universal fit" due to the flexibility of configuration and thus are able to be mounted on any type of bicycle. Lower female receiving plates 50 and 50' and lower female receiving plate inserts 46 and 46' are rotatably attached and when rotated 180 degrees provide for a lower center of gravity on small wheeled bicycles and also when rotated provide a configuration so that the elements of the bicycle rack system of the present invention does not impinge on the bicycle's brakes, fenders, screws or any other permanent feature of the bicycle. Additionally, bicycle rack system 10 comprises seat post mount 36 that attaches to any type of bicycle through devices commonly known in the prior art. Safety opening 80 is disposed in lower mount connector 30.

Figures 5A, 5B:
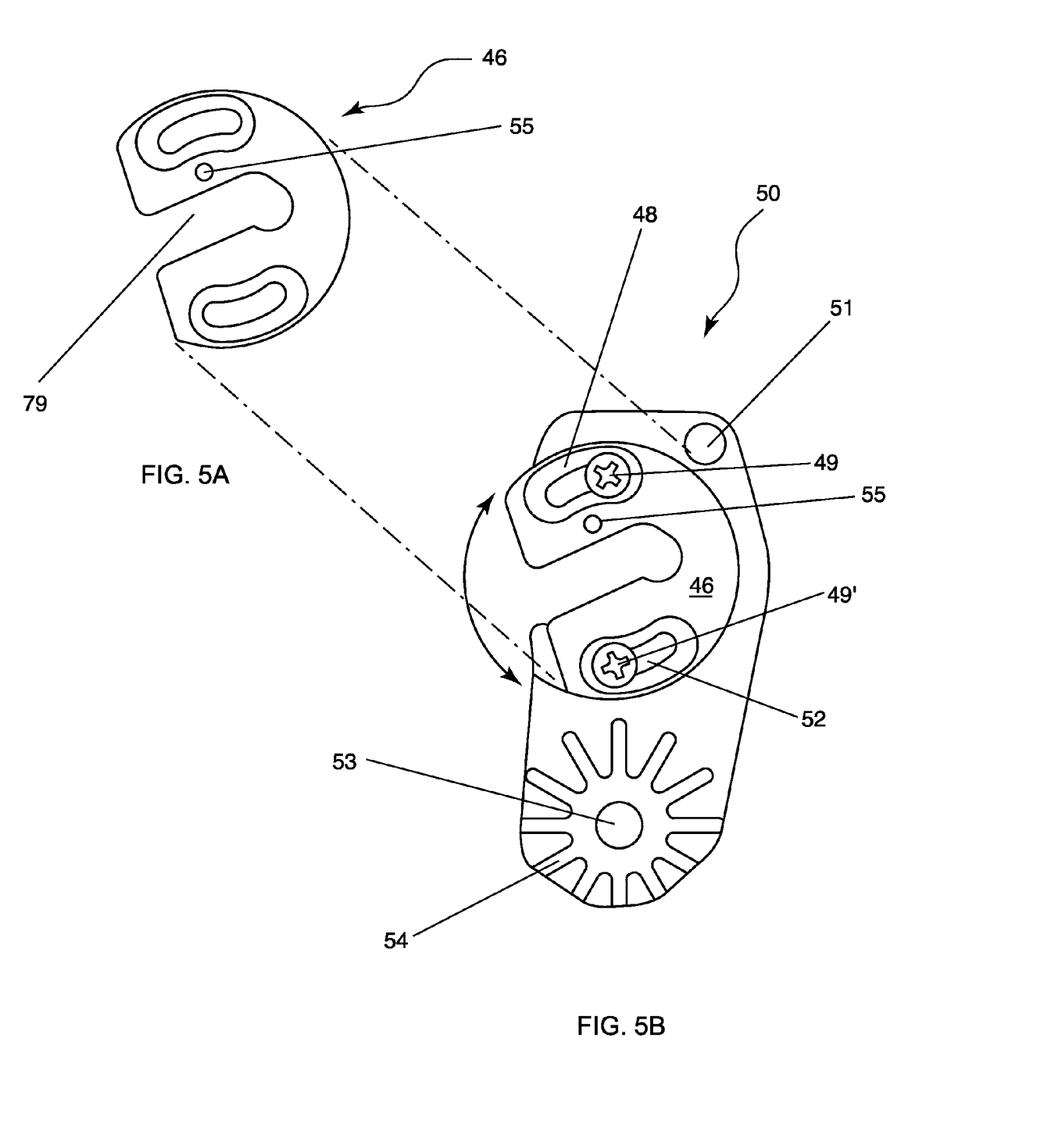
FIG. 5A is a front view of the inward side of the lower female receiving plate insert.
FIG. 5B is a front view of the inward side of the lower female receiving plate.

FIG. 5 illustrates lower female receiving plate 50 and lower female receiving plate insert 46. Lower female receiving plate 50 and lower female receiving plate insert 46 are disposably attached to a bicycle and disposed adjacent to lower mount connectors 30 and 30'. FIG. 5B illustrates a front view of lower female receiving plate 50 and FIG. 5A illustrates a front view of lower female receiving plate insert 46. The present invention comprises lower female receiving plates 50 and 50' and lower receiving mounts 72 and 72' (as illustrated in FIG. 10) that are attachably disposed on any bicycle via the rear wheel axle and skewer that are installed on every bicycle. Furthermore the unique configurations of lower female receiving plates 50 and 50' and lower receiving mounts 72 and 72' provide load transfer from the skewer to the axle, thus providing for transportation of heavier loads. Lower female receiver 54 is disposed in lower male receiver 73. The bicycle's skewer is disposed within skewer rod receiver 53 and lower bicycle receiving mount skewer rod opening 74. Lower mount connector male fasteners 44 are disposed within lower male connector female receiving fastener openings 79 and 79' disposed in lower female receiving plate insert 46 and 46' provide for lower mount connector male receiving fasteners 44 and 44' to position securely into place.

The unique shape of the opening prevents slippage. Female receiving plate insert 46 is attachably disposed adjacent to lower female receiving plate 50. Fasteners 49 and openings 52 provide for adjusting the attachment of the bicycle rack system of the present invention. Safety fastener opening 55 disposed in lower female receiving plate provides for a retaining knob screw that eliminates lateral forces which try to separate bicycle rack system 10 from lower female receiving plate 50 and female receiving plate insert 46. Safety fastener opening 55 aligns with safety opening 80 disposed in both lower mount connector outer portion 130 and lower mount connector inner portion 131 comprising lower mount connector 30. Fasteners 49 are disposed in openings in lower mount connector outer portions 130 and 130' and lower mount connector inner portions 131 and 131' (shown in FIG. 7) and secure all of these elements.

Figures 6A, 6B:
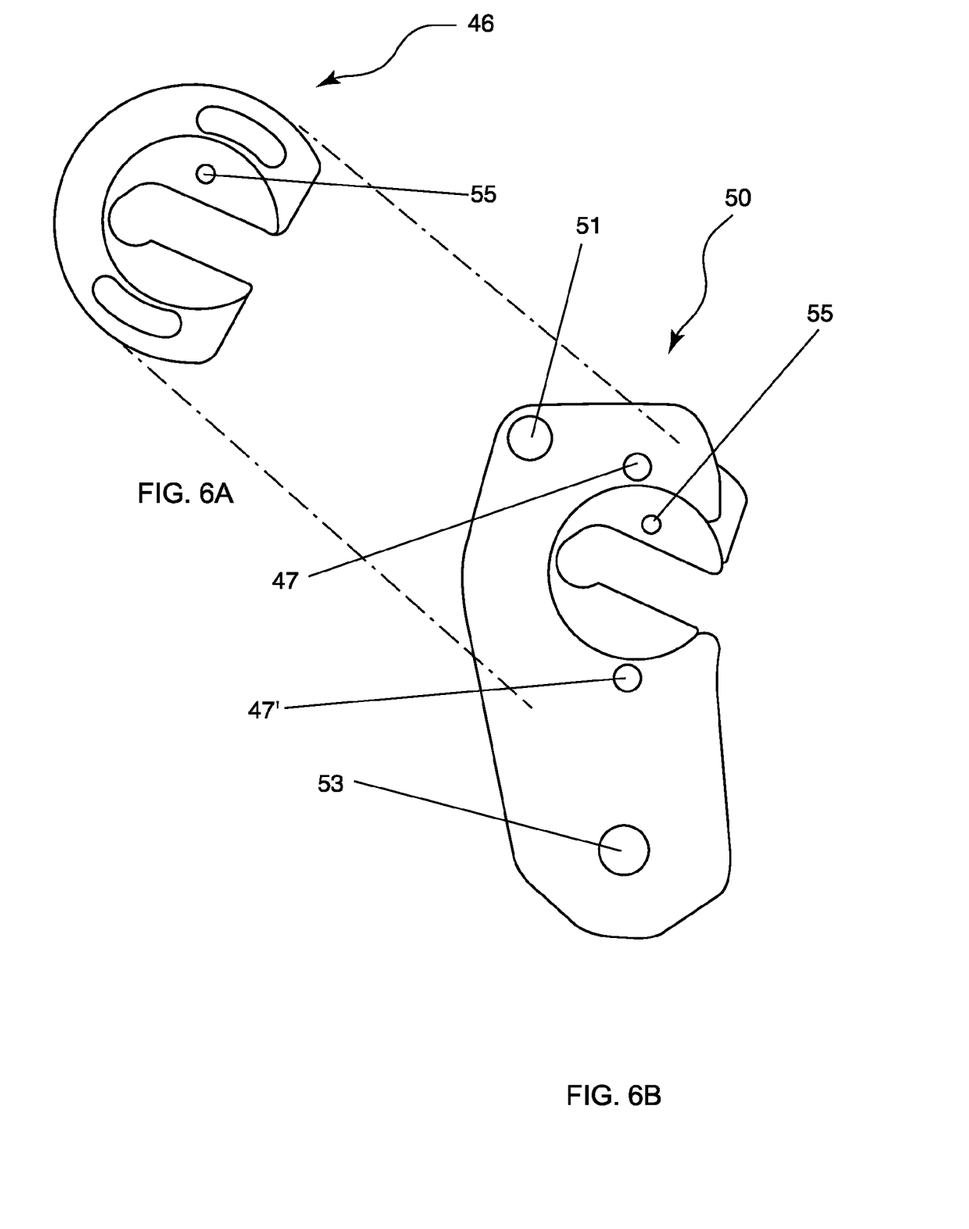
FIG. 6A is a rear view of the outward side of the lower female receiving plate insert.
FIG. 6B is a rear view of the outward side of the lower female receiving plate.

FIG. 6 illustrates the opposite side of elements 46 and 50 that are illustrated in FIG. 5. FIG. 6A is a rear view of outward facing lower female receiving plate insert 46. FIG. 6B is a rear view of outward facing lower female receiving plate 50.

As illustrated in FIGS. 5 and 6, lower mount connector male receiving fasteners 44 and 44' (as shown in FIG. 4) are disposed in lower female receiving plates 50 and 50'. Lower female receiving plate inserts 46 and 46' are inserted into opening 79 in lower female receiving plates 50 and 50' and secured via fasteners preferably comprising screws 49 and 49' which are inserted into fastener openings 52 and 52' and into lower female receiving plate fastener openings 47 and 47' (shown in FIG. 6B). The configuration of openings 52 and 52' accommodate lower female receiving plate inserts 46 and 46' and allow movement in order to accommodate different angles of approach of lower mount connector male receiving fasteners 44 and 44'.

Bevels 48 and 48' accommodate fasteners 49 and 49' and allow these fasteners to be flush with lower female receiving plate inserts 46 and 46'. Openings 55 and 55' serve as a safety feature. Openings 53 and 53' accommodate an element, preferably comprising a rod, which secures lower female receiving plates 50 and 50' to any bicycle. Lower female receiving plates 54 and 54' comprises a recessed portion that receive lower bicycle receiving mounts 72 and 72', or alternate embodiments 71 and 71' (shown in FIG. 10) specifically, the lower male receivers 73 and 73'. Lower male connector female receiving fasteners 78 and 78' provide lower male connector male receiving fasteners 44 and 44' to be moved to the appropriate position. The unique shape of lower male connector female receiving fasteners 78 and 78' eliminates the possibility of bicycle rack system 10 to be positioned out of lower male connector female receiving fasteners 78 and 78' once bicycle rack system 10 is in place. The shape of lower male connector female receiving fasteners 78 and 78' also eliminate the adjusting pivot point once the fasteners are tightened and a proper position is achieved, which eliminates the downward forces which are transferred to the axle shaft.

The method of securing the bicycle rack of the present invention to a bicycle comprises the following. Lower female receiving plate insert 46 is disposed in lower female receiving plate 50 at any angle that is deemed best for each application, and then is attached by lower female receiving plate fastener openings 47 and 47' so that lower male connector female receiving fastener openings 79 and 79' disposed in lower female receiving plate insert 46 and 46' are parallel to the floor or ground and at an accessible angle of approach for lower male connector male receiving fasteners 44 and 44' to be disposed in openings 79 and 79'. Fastener 44 is secured within the downwardly oriented vertical indentation in opening 79 as bicycle rack system 10 is rotated forward.

Seat post mount 36 is then secured by any means known to those having ordinary skill in the art fastener 44 is secured within opening 79 due to the unique configuration of opening 79. A retaining safety screw that is attached to lower mount connector outer portion 130 and lower mount connector inner portion 131 and also attached to a hand-tightening knob passes through openings in lower mount connector outer portion 130 and lower mount connector inner portion 131. The safety screw attached to the hand-tightening knob is hand tightened into opening 55. Lower female receiving plates 50 and 50' rotate to allow forward, rearward and upward downward positioning of opening 79.

FIG. 7 illustrates views of lower mount connector 30 and 30' comprising lower mount connector outer portions 130 and 130' and lower mount connector inner portions 131 and 131'. FIG. 7A illustrates the interior of lower mount connector outer portion 130. FIG. 7B illustrates the interior of lower mount connector inner portion 131. FIG. 7C illustrates the exterior of lower mount connector outer portion 130. FIG. 7D illustrates the exterior of lower mount connector interior portion 131. FIG. 7 illustrates how lower mount connectors 30 and 30' comprising lower mount connector outer portions 130 and 130' and lower mount connector inner portions 131 and 131' are connected. FIGS. 7A and 7B show the inward facing sides that comprise the lower mount connectors 30 and 30'. Forward mounting tubes 26 and 26' and rear mounting tubes 28 and 28' are inserted into lower mount receiving openings 56 and 56' in lower mount connectors 30 and 30'. Tubes when inserted in openings 56 lock via groove 57 and are secured. Lower mount connector female addition receivers 43 and 43' allow for additional embodiments to be added to bicycle rack system 10. Fastener indentations 59 and 59' ensure that the fasteners comprising screws inserted into lower mount connector openings 59 and 59' are flush with lower mount connectors 30 and 30'.

Figure 7A:
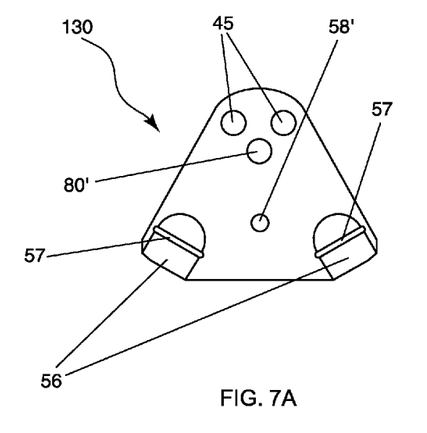
FIG. 7A illustrates the interior of the exterior portion of the lower mount connector.
Figure 7B:
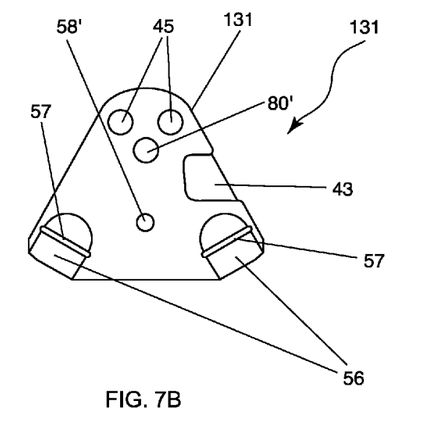
FIG. 7B illustrates the interior of the interior portion of the lower mount connector.
Figure 7C:
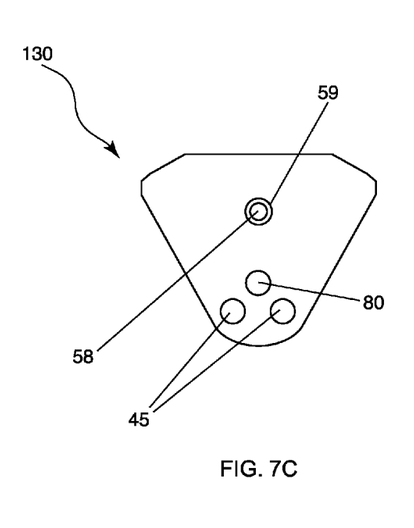
FIG. 7C illustrates the exterior of the exterior portion of the lower mount connector.
Figure 7D:
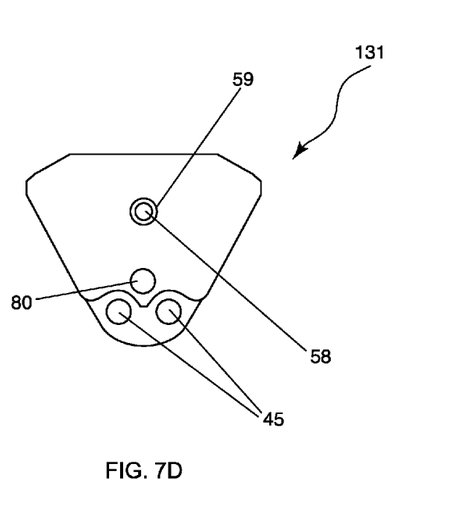
FIG. 7D illustrates the exterior of the interior portion of the lower mount connector.

FIGS. 7C and 7D illustrate the outward facing sides of lower mount connector outer portion 130 and lower mount connector inner portion 131. Openings 45 accommodate lower mount connector male fasteners 44 (shown in FIG. 4).

FIG. 8 illustrates upper rear mount connectors 20 and 20' comprising upper rear mount connector outer portions 120 and 120' and upper rear mount connector inner portions 121 and 121'. FIG. 8A illustrates the interior of upper rear mount connector exterior portion 120. FIG. 8B illustrates the interior of upper rear mount connector interior portion 121. FIG. 8C illustrates the exterior of upper rear mount connector exterior portion 120. FIG. 8D illustrates the exterior of upper rear mount connector interior portion 121.

Figure 8A:
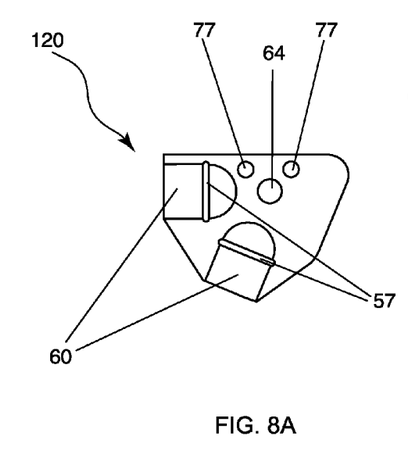
FIG. 8A illustrates the interior of the exterior portion of the upper rear mount connector.
Figure 8B:
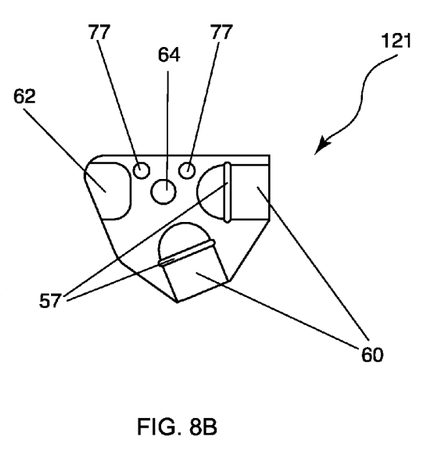
FIG. 8B illustrates the interior of the interior portion of the upper rear mount connector.

FIGS. 8A and 8B illustrate the inward facing portions that comprise upper rear mount connectors 20 and 20'. Upper mounting tubes 22 and 22' and rear mounting tubes 28 and 28' are disposed within upper rear mount receiving openings 60 and 60' in upper rear mount connectors 20 and 20'. Tubes 22 and 22' and 28 and 28' when inserted in openings 60 lock via groove 57 and are secured. Upper rear mount female connector addition receivers 62 and 62' allow for additional embodiments to be added to bicycle rack system 10. Fastener indentations 159 and 159' ensure that the fasteners inserted into upper rear mount fastener openings 64 and 64' are flush with upper rear mount connectors 20 and 20'.

Upper rear mount connector openings 77 and 77' secure upper rear mount connectors 20 and 20' to back crossbar 39. Upper rear mount opening 64 accommodates a fastener that secures upper rear mount connector outer portions 120 and 120' and upper rear mount connector inner portions 121 and 121' together.

Figure 8C:
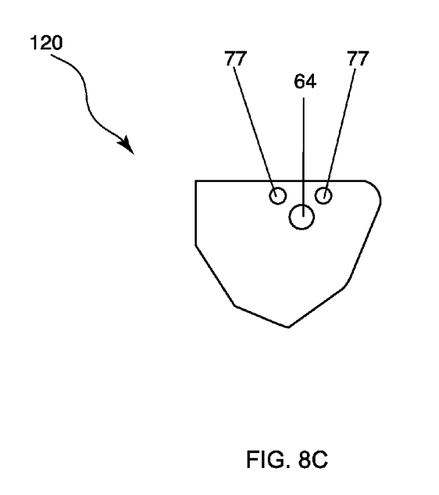
FIG. 8C illustrates the exterior of the exterior portion of the upper rear mount connector.
Figure 8D:
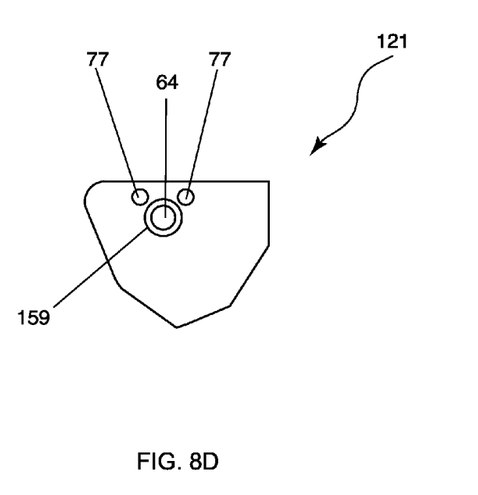
FIG. 8D illustrates the exterior of the interior portion of the upper rear mount connector.
Figure 9A:
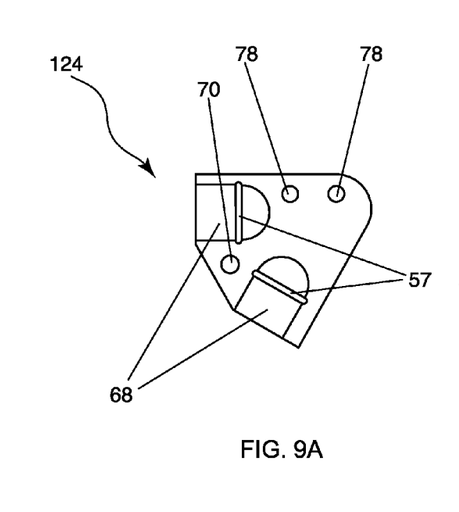
FIG. 9A illustrates the interior of the exterior portion of the upper forward mount connector.
Figure 9B:
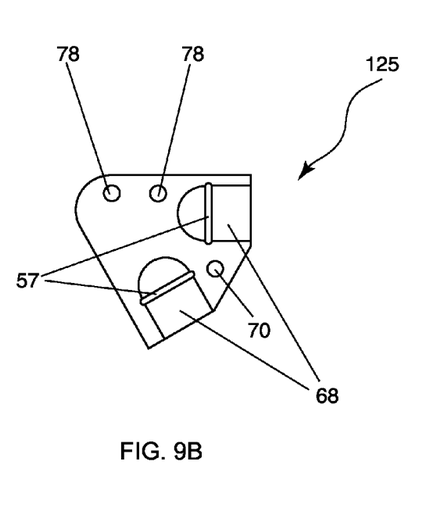
FIG. 9B illustrates the interior of the interior portion of the upper forward mount connector.
Figure 9C:
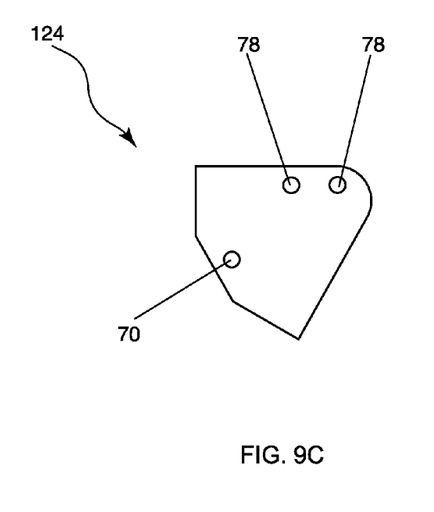
FIG. 9C illustrates the exterior of the exterior portion of the upper forward mount connector.
Figure 9D:
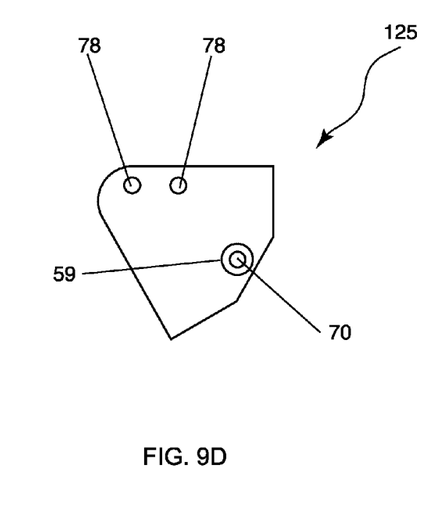
FIG. 9D illustrates the exterior of the interior portion of the upper forward mount connector.

FIGS. 8C and 8D illustrate the outward facing sides 120 and 120' and 121 and 121' that comprise the upper rear mount connectors 20 and 20'. Bevel 159 is disposed adjacent to opening 64 to secure a fastener and ensure that the fastener head is flush with upper rear mount connector portion 121.

FIG. 9 illustrates upper forward mount connectors 24 and 24' comprising portions 124 and 125 and 124' and 125'. FIG. 9A illustrates the interior of upper forward mount connector exterior portion 124. FIG. 9B illustrates the interior of upper forward mount connector interior portion 125. FIG. 9C illustrates the exterior of upper forward mount connector exterior portion 124. FIG. 9D illustrates the exterior of upper forward mount connector interior portion 125. The two pieces, upper forward mount connector outer portions 124 and 124' and upper forward mount connector inner portions 125 and 125' connect in order to secure upper mounting tubes 22 and 22' and front mounting tubes 26 and 26'. FIGS. 9A and 9B illustrate the inward facing sides that comprise upper forward mount connectors 24 and 24'. Upper mounting tubes 22 and 22' and forward mounting tubes 26 and 26' are disposed in upper forward mount receiving openings 68 and 68' in upper forward mount connectors 24 and 24'. Tube lock in grooves 57 and 57' secure upper mounting tubes 22 and 22' and forward mounting tubes 26 and 26' into upper forward mount connectors 24 and 24'. Fastener head indentations 59 and 59' ensure that the fasteners inserted into upper forward mount connector fastener openings 70 and 70' are flush with upper forward mount connectors 24 and 24'. Upper forward mount connector openings 70 and 70' secure upper forward mount connector outer halves 124 and 124' and upper forward mount connector inner halves 125 and 125' together. Upper forward mount connector extra fastener openings 78 and 78' secure upper forward mount connectors 24 and 24' to each other via front crossbar 38. FIGS. 9C and 9D illustrate the outward facing sides that comprise the upper forward mount connectors 24 and 24'.

FIG. 10 illustrates various views of bicycle receiving element 72. FIG. 10A is a side view of an inward facing lower bicycle receiving element. FIG. 10B illustrates a side view of an inward facing lower bicycle receiving element of an alternate embodiment of the present invention. FIG. 10C is a side view of the outward facing lower bicycle receiving element. FIG. 10D is a side view of the facing lower bicycle receiving element.

FIG. 10 illustrates two embodiments 71 and 72 of lower bicycle receiving mounts. The diameter of lower bicycle receiving mount skewer rod opening 74 varies as needed. A larger diameter opening (i.e. the opening illustrated in FIG. 10B) used when the bicycle has a solid axle, disburses more load to the dropout frame and the axle. A smaller diameter opening (i.e. the opening illustrated in FIG. 10A) used with a bicycle skewer, disburses even more, although not all skewer forces, to the bicycle's axle and frame dropout.

Figure 10A:
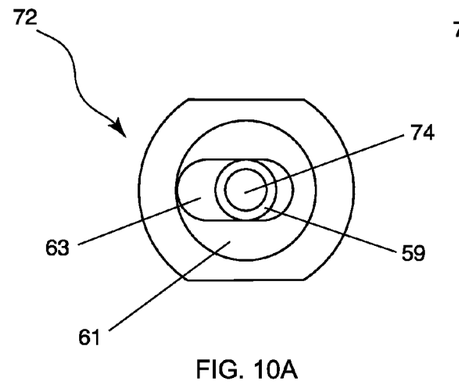
FIG. 10A is a front view of one embodiment of an inward facing lower bicycle receiving element.
Figure 10B:
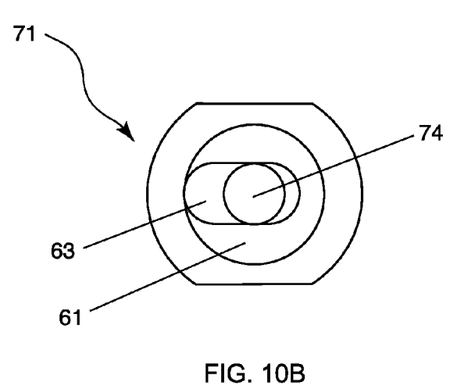
FIG. 10B illustrates a front view of an alternate embodiment of an inward facing lower bicycle receiving element.

The "universal fit" aspect of the present invention is achieved by providing a lateral adjustment capability that is currently lacking in bicycle rack systems. Currently available axle hubs and bottom brackets commonly accommodate components that range between 105 mm and 145 mm thicknesses. Lower bicycle receiving mount 72 as illustrated in FIG. 10A and alternate lower bicycle receiving mount 71 as illustrated in FIG. 10B differ in size, configuration and thickness that allow for both rotation and also stabilization. Lower bicycle receiving mount 72 disburses load from skewers to the axle and the axle dropout.

Lower bicycle receiving mount 72 is disposed on the bicycle's axle and the bicycle's skewer rod. When additional step up 63 is disposed adjacent to the axle and inserted into the bicycle's dropout, lower bicycle receiving mount 72 rotates around the axle as additional step up 63 is disposed adjacent to (on solid axel bicycles) and opposite opposing axle openings and is disposed on the skewer (on skewer/cassette or geared bicycles) and between the axle and the bicycle frame dropout. The angle of the dropout is irrelevant, thus ensuring the modularity of the present invention. Lower female receiving plate 50 combined with lower bicycle receiving mount 72 provides installation of the present invention on any bicycle configuration.

FIG. 10A shows the side of lower bicycle receiving mounts 72 and 72' that face inward toward a bicycle. Lower bicycle receiving mounts 72 and 72' comprise step up 61 and 61' and additional step up 63 and 63'. The unique structure of lower bicycle receiving mounts 72 and 72' allow for an element comprising a skewer rod to become the attach point for lower bicycle receiving mounts 72 and 72'. This is accomplished by step ups 61 and 61' and additional step ups 63 and 63' transferring most of the vertical shear loads of bicycle rack system 10 payload to the axle of the bicycle and frame dropout slot avoiding any and all sheer loading on the skewer rod.

Step up 61 and 61' and additional step up 63 and 63' also make it possible to fit most or all bicycle frame drop out configurations while avoiding sheer loading on the skewer rod. The rod is inserted through lower bicycle receiving mount rod openings 74 and 74' which then extend through rod receivers 53 and 53'. Screw head indentations 59 and 59' ensure that the screw is flush with the lower bicycle receiving mounts 72 and 72'.

FIG. 10B illustrates alternate embodiment 71 of lower bicycle receiving mounts 72 and 72'.

Figure 10C:
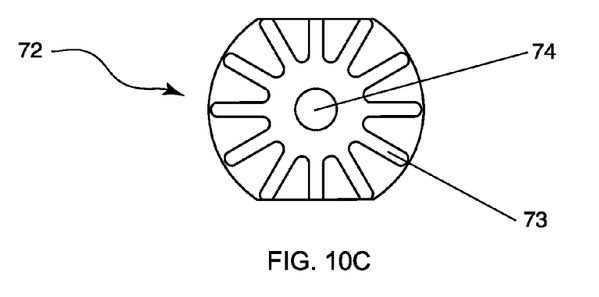
FIG. 10C is a front view of the other side of the outward facing lower bicycle receiving element.

FIG. 10C illustrates outward facing side of the lower bicycle receiving mounts 72 and 72'. The lower male receivers 73 and 73' fit into the lower female receiving plate axles 54 and 54'.

Figure 10D:
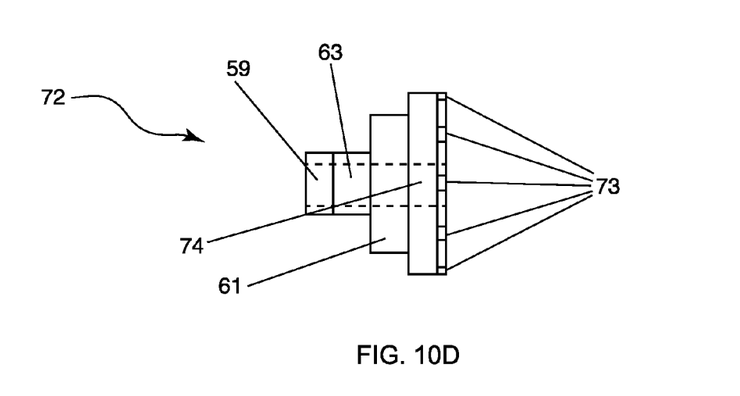
FIG. 10D is a side view of the facing lower bicycle receiving element.

FIG. 10D illustrates a side view of lower bicycle receiving mounts 72 and 72'.

Figure 11:
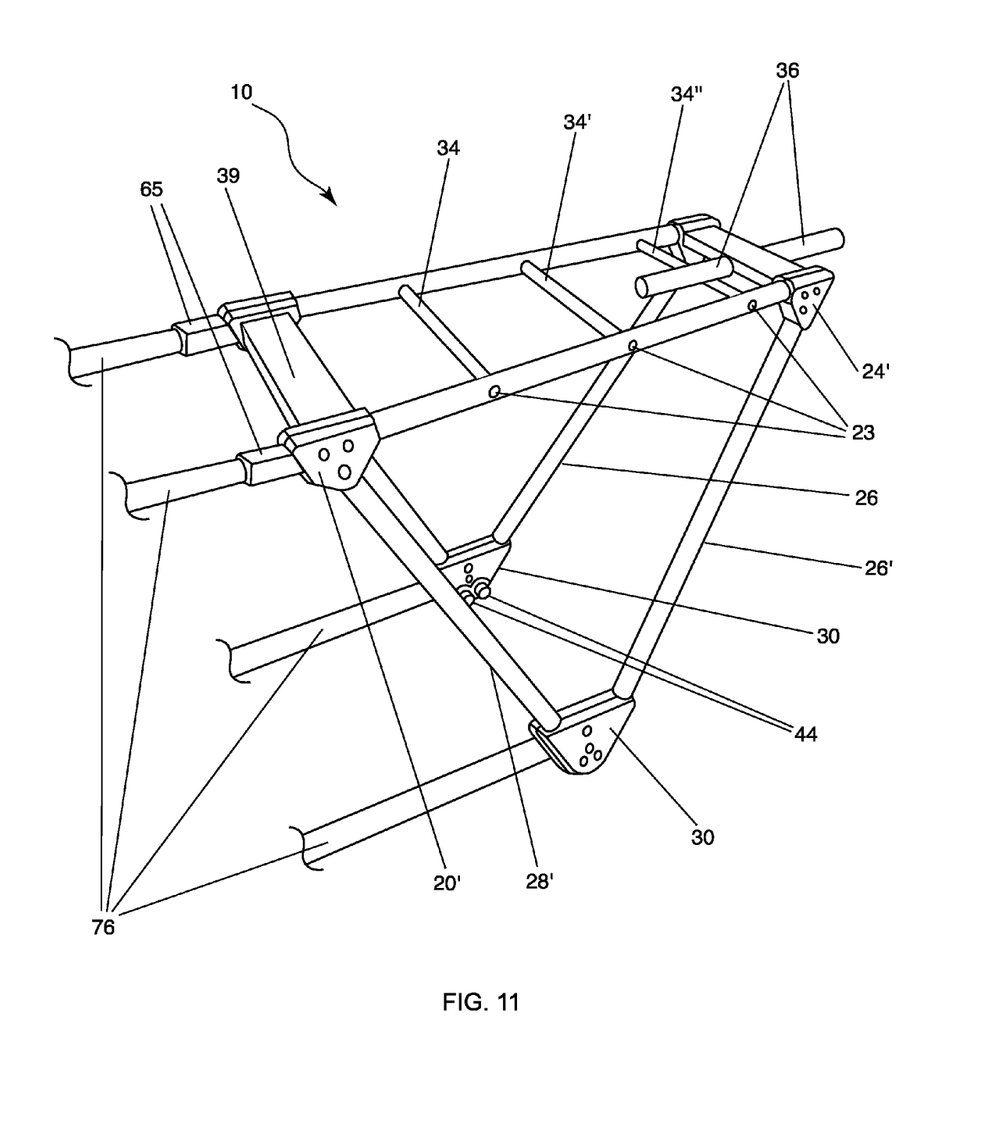
FIG. 11 is a side perspective view of the bicycle rack system comprising connector element.

FIG. 11 is a side perspective view of the bicycle rack system comprising connector elements. Connector elements 65 provide for the accommodation of a plurality of attachments to be added to bicycle rack system 10. Connector elements 65 engage with lower mount connector female addition receivers 43 and 43' as illustrated in FIG. 7B and upper rear mount female connector addition receivers 62 and 62' as illustrated in FIG. 8B. Extension bars 76 accommodate a plurality of attachments to bicycle rack system 10.

Figures 12A, 12B, 12C:
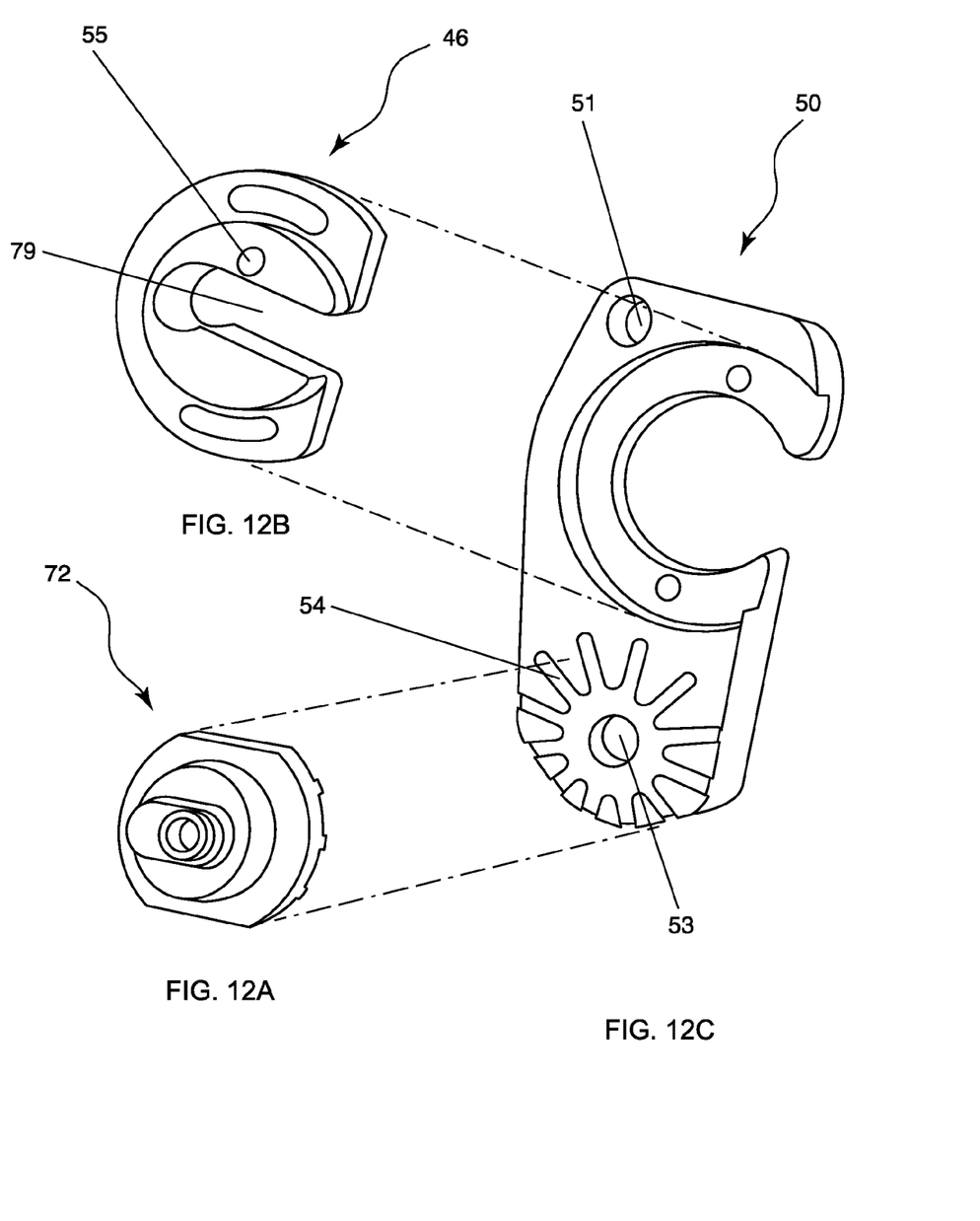
FIG. 12A is a front perspective view of the lower bicycle receiving element.
FIG. 12B is a front perspective view of the lower female receiving plate insert element.
FIG. 12C is a front perspective view of the lower female receiving plate element.

FIG. 12A is a front perspective view of lower bicycle receiving mount 72. FIG. 12B is a front perspective view of lower female receiving plate insert 46. FIG. 12C is a front perspective view of lower female receiving plate 50. FIG. 12A illustrates a perspective view of lower bicycle receiving mount 72, which is attachably disposed on lower female receiving plate 50 comprising lower female receiving plate receiver 54, as shown in FIG. 12C. This configuration serves as a load transfer feature that prevents most of the vertical shear loading of the skewer. FIG. 12B illustrates lower female receiving plate insert 46 that is attachably disposed in lower female receiving plate 50 disposed in lower bicycle receiving mounts 72 and 72' comprising lower male receivers 73 and 73' (as illustrated in FIG. 10C) respectively provide for lower female receiving plates 50 and 50' to be installed at any angle.

Lower female receiving plate inserts 46 and 46' rotate thus providing additionally flexible angle of approach of lower male connector male receiving fasteners 44 and 44' that insert into lower female receiving plate inserts 46 and 46'. The rear skewer of the bicycle is inserted through skewer rod receivers 53 and 53' and lower bicycle receiving mount skewer rod openings 74 and 74', thus securing lower female receiving plates 50 and 50' and lower bicycle receiving mounts 72 and 72' and attaching them to the bicycle.

Figure 13:
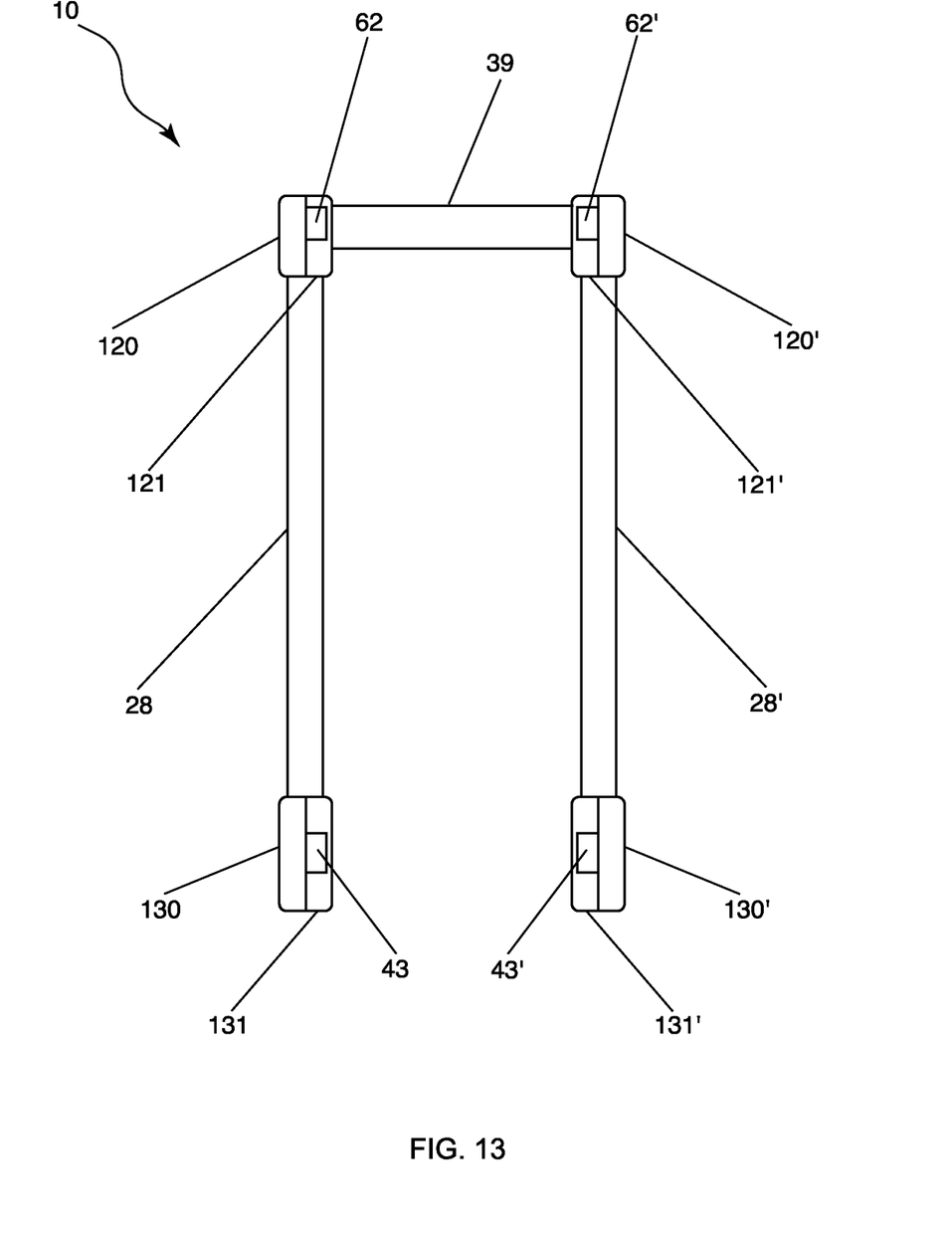
FIG. 13 is a rear view of the bicycle rack system of the present invention.

FIG. 13 illustrates a rear view of bicycle rack system 10 of the present invention. This view illustrates an important flexible aspect of the bicycle rack system of the present invention. Lower mount connector female addition receiving elements 43 and 43' and upper rear mount connector female addition receiving elements 62 and 62' provide for a plurality of attachments to be added to the bicycle rack system 10.

Another flexible aspect of bicycle rack system 10 of the present invention is the ability of the bicycle rack system to easily be taken on and off of a bicycle. Lower female receiving plates 50 and 50' and lower bicycle receiving mounts 72 and 72' are permanently installed on any bicycle and offer a platform for bicycle rack system 10 to easily be attached. Lower male connector female receiving fastener openings 79 and 79' disposed in lower female receiving plate insert 46 and 46' provide for lower mount connector male receiving fasteners 44 and 44' to position securely into place.

Another improvement of the present invention is the modularity of the bicycle rack system. The unique connector design of upper rear mount connectors 20 and 20', upper forward mount connector 24 and 24', and lower mount connectors 30 and 30' provide for the bicycle rack system to be easily assembled by the user. The modularity also provides for reduced shipping costs due to the reduced size before assembly. Additional embodiments are made possible because of the modularity of the bicycle rack system.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters previously set forth herein or shown in the accompanying drawings are to be interpreted in an illustrative and non-limiting sense.

What is claimed is:

1. A bicycle rack system comprising:
bottom connectors, each comprising two portions and female connectors to allow for tubes to be inserted;
front top connectors, each comprising two portions;
rear top connectors, each comprising two portions and female connectors to allow for tubes to be inserted;
a plurality of tubes inserted into and secured by said bottom, rear top, and front top connectors;
adjustable female receiving plates disposed on a bicycle axle;
male fasteners connectably and securably attached to the bottom connectors, wherein said male fasteners are securably disposed in the releasable female receiving plates securably disposed on a bicycle axle; and
a seat post mount securably attached to a seat post of the bicycle and to a crossbar between the front top connectors.

2. A method of installing a bicycle rack system comprising:
providing bottom connectors, each comprising two portions and female connectors to allow for additional tubes to be inserted;
providing front top connectors, each comprising two portions;
providing rear top connectors, each comprising two portions and female connectors to allow for additional tubes to be inserted;
inserting and securing a plurality of tubes in the bottom, rear top, and front top connectors;
securably disposing male fasteners in releasable female receiving plates securably disposed on a bicycle axle; and
securably attaching seat post mount to seat post of bicycle and to crossbar between front top connectors.

* * * * *